United States Patent
Huang (10) Patent No.: US 12,080,180 B2
(45) Date of Patent: Sep. 3, 2024

(54) ANTI-COLLISION SYSTEM AND METHOD FOR AN AIRCRAFT AND AIRCRAFT INCLUDING THE ANTI-COLLISION SYSTEM

(71) Applicant: AIRBUS (BEIJING) ENGINEERING CENTRE COMPANY LIMITED, Beijing (CN)

(72) Inventor: Jinming Huang, Beijing (CN)

(73) Assignee: AIRBUS (BEIJING) ENGINEERING CENTRE COMPANY LIMITED, Beijing (CN)

( * ) Notice: Subject to any disclaimer, the term of this patent is extended or adjusted under 35 U.S.C. 154(b) by 0 days.

(21) Appl. No.: 17/852,011

(22) Filed: Jun. 28, 2022

(65) Prior Publication Data

US 2022/0415194 A1    Dec. 29, 2022

(30) Foreign Application Priority Data

Jun. 29, 2021    (CN) .......................... 202121466975.5

(51) Int. Cl.
G08G 5/04 (2006.01)
G01S 13/933 (2020.01)
G06V 20/58 (2022.01)
G08G 5/00 (2006.01)

(52) U.S. Cl.
CPC .............. *G08G 5/04* (2013.01); *G01S 13/933* (2020.01); *G08G 5/0013* (2013.01); *G06V 20/58* (2022.01)

(58) Field of Classification Search
CPC ...... G08G 5/04; G08G 5/0013; G01S 13/933; G06V 20/58
See application file for complete search history.

(56) References Cited

U.S. PATENT DOCUMENTS

| 9,881,508 B2 * | 1/2018 | Silver | G08G 5/0078 |
| 2006/0111841 A1 * | 5/2006 | Tseng | G06V 20/58 340/436 |
| 2013/0110323 A1 * | 5/2013 | Knight | B64C 25/44 701/3 |

(Continued)

FOREIGN PATENT DOCUMENTS

| CN | 112382131 A | * | 2/2021 | ............... G08G 1/16 |
| EP | 3 531 400 | | 8/2019 | |

*Primary Examiner* — Curtis A Kuntz
*Assistant Examiner* — James E Munion
(74) *Attorney, Agent, or Firm* — Nixon & Vanderhye P.C.

(57) ABSTRACT

Disclosed are an anti-collision system and method for an aircraft and an aircraft including the anti-collision system. The anti-collision system includes: a sensor data processing unit configured to process data received from a plurality of sensors to detect objects around the aircraft, and output a result about detected objects; a safeguarding box building unit configured to generate, based on an aircraft geometry database, a three-dimensional safeguarding box for the aircraft; and a risk assessment unit configured to calculate relative distances between detected objects and the aircraft, and determine whether there is a collision risk between the aircraft and an object, among the detected objects, located in the safeguarding box or to be entering into the safeguarding box, wherein the system is configured to output an alarm or a warning when there is the collision risk.

25 Claims, 8 Drawing Sheets

(56) References Cited

U.S. PATENT DOCUMENTS

2015/0262492 A1* 9/2015 Barnes ................. G08G 5/0021
                                                                                   701/301
2019/0266904 A1* 8/2019 Kant .................... G08G 5/0013
2019/0295274 A1* 9/2019 Rutkiewicz ............. G01S 17/48

* cited by examiner

ANTI-COLLISION SYSTEM AND METHOD FOR AN AIRCRAFT AND AIRCRAFT INCLUDING THE ANTI-COLLISION SYSTEM

CROSS-REFERENCE TO RELATED APPLICATION

This application claims priority to and benefit of Chinese Patent Application No. 202121466975.5, filed on Jun. 29, 2021, which is hereby incorporated by reference as fully set forth herein.

TECHNICAL FIELD

The present disclosure generally relates to the field of aviation, and more particularly to surface operation safety of an aircraft.

BACKGROUND

The surface operation safety of an aircraft, especially obstacle detection, is becoming more and more important. Wingtip collision accidents often occur due to three factors: misjudgment of the distance between aircrafts by pilots; inefficient communication among parties during the surface operation; and operators could not obtain a position related information of an aircraft when the aircraft is not capable of broadcasting its position externally due to a systemic power failure (in this case, an ADS-B (Automatic Dependent Surveillance Broadcast) output cannot be obtained). The digital anti-collision solution used for surface movement guidance of airport vehicles to improve operational safety relies on the historical records of accidents.

At present, several aircraft anti-collision solutions have been proposed.

A first solution is an ADS-B (Automatic Dependent Surveillance Broadcast) based collision prevention method. The solution includes aggregating 3D spatial data from ADS-B-out data of vehicles, determining a trajectory intent for each vehicle, identifying potential surface collisions, and presenting alarms associated with the potential surface collisions. The ADS-B-based solution is used to monitor vehicles surface movement guidance for anti-collision. However, a collision may also occur when one vehicle is under tow while the other is still. Moreover, the ADS-B position output sometimes has an error of meters or tens of meters.

A second solution is a radar-adaptive beam pattern for wingtip protection. An enhanced system for the second solution is proposed. The system uses adaptive steering of a radar beam pattern for coverage during aircraft turns. The radar sensor system is installed in an adaptive rack which would mechanically or electrically alter the radar sensor's beam pattern in order to adapt the radar sensor's FOV (Field of View) to cover the area of an anticipated aircraft wingtip trajectory. A forward-looking radar system for generating and/or presenting airport surface traffic information and an anti-collision radar for a taxiing machine have been developed. The anti-collision radar is able to be attached laterally to the fuselage and to detect obstacles on a collision course with a portion of the machine facing said radar. The radar includes at least one emission antennal channel emitting a wave of the FMCW (Frequency Modulated Continuous Wave) type and multiple reception antennal channels placed in the same plane, where the form of the wave and the field of angular coverage of the radar depend on the velocity of the machine. The radar-based solution has the advantages of low cost, resilience against low light and bad weather conditions. However, the radar is capable of detecting only objects with low spatial resolution, and cannot obtain much information about the spatial shape of the object.

The third solution is a vision-based anti-collision system, which utilizes an anti-collision system including a pair of video cameras mounted to a vertical stabilizer of the aircraft, a machine vision processing unit and a system to inform the pilots of a potential collision. A light projector in combination of a camera detecting the position of objects in the scene has been proposed. The light projector is further configured to control the intensity of the collimated beam of light. The vision-based solution is proposed for video analytics in the scene. However, the vision-based solution exhibits poor performance in low light and bad weather conditions.

A light detection and ranging (LiDAR)-based solution, having benefits of having a long range with a relatively wide field of view, is proposed. However, the solution has two critical problems unsolved. The first problem is that changes in reflectivity of surface due to wetness affects the performance of LiDAR sensors. The second problem is a poor resolution and a limited laser power due to laser safety, which in turn affect the performance of the sensor.

SUMMARY

A brief summary of embodiments of the present disclosure is given in the following, so as to provide basic understanding on some aspects of the present disclosure. It should be understood that, the summary is not an exhaustive summary of the present disclosure. The summary is neither intended to determine key or important parts of the present disclosure, nor intended to limit the scope of the present disclosure. An object of the summary is to provide some concepts in a simplified form, as preamble of a detailed description later.

It is an object of the present disclosure to enhance surface movement guidance of airport vehicles, so as to avoid collision and improve operation safety.

According to an aspect of the present disclosure, an anti-collision system for an aircraft is provided, which includes: a sensor data processing unit configured to process data received from a plurality of sensors to detect objects around the aircraft, and output a result about detected objects; a safeguarding box building unit configured to generate, based on an aircraft geometry database, a three-dimensional safeguarding box for the aircraft; and a risk assessment unit configured to calculate relative distances between detected objects and the aircraft, and determine whether there is a collision risk between the aircraft and an object, among the detected objects, located in the safeguarding box or to be entering into the safeguarding box, wherein the system is configured to output an alarm or a warning when there is the collision risk.

Preferably, the multiple sensors include two vision sensors that are installed at a front portion of a fuselage of the aircraft.

Preferably, the multiple sensors further include two vision sensors installed respectively above and below a tail portion of the fuselage of the aircraft.

Preferably, the vision sensors are installed in close proximity to lights on the aircraft, and the lights are configured to illuminating surrounding environments of the vision sensors in response to an instruction from the anti-collision system.

Preferably, the anti-collision system further includes an image stitching unit configured to synchronize images output from the vision sensors, and stitch the images to obtain a panoramic image.

Preferably, the risk assessment unit is further configured to calculate the relative distance between the aircraft and one of the detected objects based on received automatic dependent surveillance-broadcast data and absolute position information of the aircraft, determine whether the relative distance is less than a range for the safeguarding box, and output the alarm if the relative distance is less than the range for the safeguarding box.

Preferably, the plurality of sensors further comprise a range sensor configured to detect a potential collision object around the aircraft, and the risk assessment unit is further configured to calculate the relative distance between the aircraft and one of the detected objects based on absolute position information of the aircraft and data received from at least one of the vision sensors and the range sensor, determine whether the relative distance is less than a range for the safeguarding box, and output the alarm if the relative distance is less than the range for the safeguarding box.

Preferably, the risk assessment unit is further configured to determine whether there is a collision risk with one of the detected objects by calculating a proximity rate of the object to be entering into the safeguarding box based on received automatic dependent surveillance-broadcast data and absolute position information of the aircraft, and output the warning if there is the collision risk.

Preferably, the risk assessment unit is further configured to determine whether there is a collision risk with one of the detected objects by calculating a proximity rate of the object to be entering into the safeguarding box based on absolute position information of the aircraft and data received from at least one of the vision sensors and the range sensor, and output the warning if there is the collision risk.

Preferably, the risk assessment unit is further configured to calculate the proximity rate based on data output from a wheel speed sensor and used for correcting a relative displacement of the aircraft, where the absolute position information of the aircraft is obtained based on the relative displacement and initial position information of the aircraft. For example, the relative displacement may be obtained by integrating speed data output from the wheel speed sensor.

Preferably, the proximity rate is a rate of change of the relative distance between the aircraft and the detected object over time, and the warning is output if the rate of change is greater than a predetermined threshold.

Preferably, the absolute position information of the aircraft is provided by an inertial measurement unit (IMU) and a global positioning system (GPS).

Preferably, the risk assessment unit is further configured to classify the detected objects located within the safeguarding box or to be entering into the safeguarding box.

Preferably, the objects are classified into people, other aircraft, airport infrastructure, ground vehicle, and unknown.

Preferably, the risk assessment unit is further configured to filter out an object with which wingtip collision is not to occur based on a classification result.

Preferably, the anti-collision system further includes a user interface configured to display the panoramic image and present the warning or alarm provided by the risk assessment unit.

Preferably, the warning or alarm may be provided by using a user terminal, such as a microphone or a mobile device.

Preferably, when the aircraft is under tow, the alarm or the warning and the panoramic view image are shared among a driver of a tow tug, a pilot of the aircraft and maintenance engineer via a local network.

According to another aspect of the present disclosure, an aircraft is also provided, which includes the above anti-collision system for an aircraft.

According to still another aspect of the present disclosure, an anti-collision method for an aircraft is also provided, which includes: receiving data from a plurality of sensors and outputting a result about detected objects; generating, based on an aircraft geometry database, a three-dimensional safeguarding box for the aircraft; calculating relative distances between detected objects and the aircraft, and determining whether there is a collision risk between the aircraft and an object, among the detected objects, located in the safeguarding box or to be entering into the safeguarding box; and outputting a warning or an alarm if there is the collision risk.

According to other aspects of the present disclosure, corresponding computer program codes, a computer readable storage medium, and a computer program product are further provided. The computer program product, when run by a processor, is capable of implementing the above anti-collision method for an aircraft.

The solution of the present disclosure has the advantages of adaptive perception for environment, enhanced safety and improved visibility.

Other aspects of the embodiments of the present disclosure are given in the following description sections, where the detailed description is used to fully disclose rather than impose limitations on the preferred embodiments of the embodiments of the present disclosure.

BRIEF DESCRIPTION OF THE DRAWINGS

The present disclosure may be understood better with reference to the description given in conjunction with drawings hereinafter. The same or similar reference numerals are used to indicate the same or similar components throughout all the drawings. The drawings together with the following detailed description are included in the specification, form a part of the specification, and are used to further illustrate preferred embodiments of the present disclosure and explain principles and advantages of the present disclosure by examples. In the drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, and these decisions may change as the embodiments differs.

Here, it should also be noted that in order to avoid obscuring the present disclosure due to unnecessary details, only components closely related to the solution according to the present disclosure are illustrated in the accompanying drawing, and other details having little relationship to the present disclosure are omitted.

In addition, when describing components of the present disclosure, terms such as first, second, A, B, (a), (b), and the like may be used herein. These terms are only used to distinguish one part from other parts, without limiting an attribute, an order, a sequence, and the like of the corresponding parts. When it is described that a component is "connected to" or "coupled to" another component, it should be construed that the one component may be directly "connected to" or "coupled to" the other component, or may be "connected to" or "couple to" another component via an intermediate component.

In order to improve the surface operation safety of an aircraft, and in particular to avoid wingtip collision between aircrafts, an anti-collision system is provided according to the present disclosure. In the following, an anti-collision system 100 for an aircraft according to an embodiment of the present disclosure is described in detail in combination with FIGS. 1 to 6.

Figure 1:
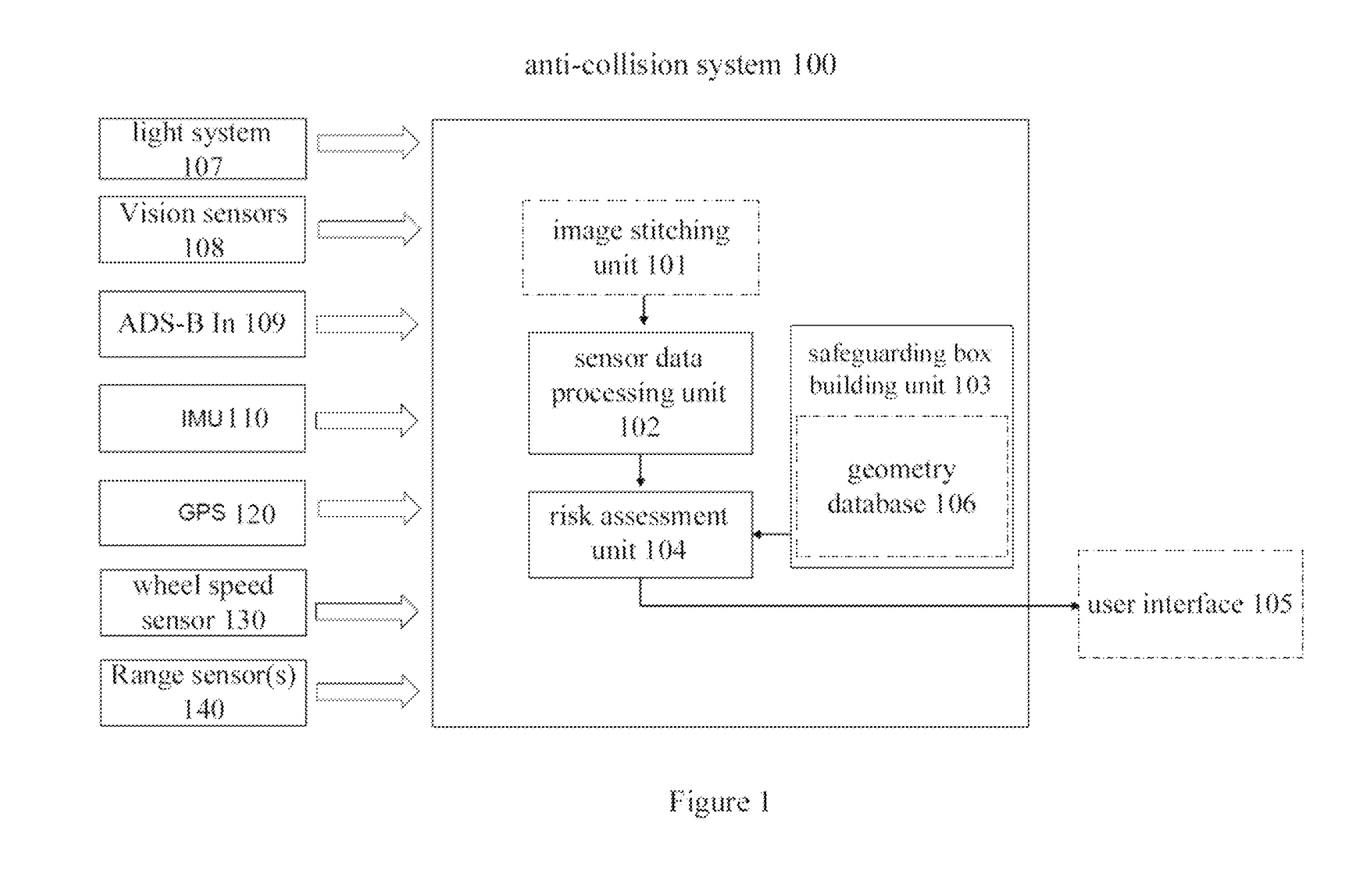
FIG. 1 is a block diagram of an anti-collision system for an aircraft according to an embodiment of the present disclosure.

FIG. 1 is a block diagram of an anti-collision system for an aircraft according to an embodiment of the present disclosure.

As shown in FIG. 1, the anti-collision system 100 includes a sensor data processing unit 102, a safeguarding box building unit 103 and a risk assessment unit 104.

The sensor data processing unit 102 processes data received from various sensors to detect objects around the aircraft. As shown in FIG. 1, the sensors may include, for example, vision sensors 108, an ADS-B In 109, an IMU (Inertial Measurement Unit) 110, a GPS (Global Positioning System) 120, a wheel speed sensor 130 and range sensor(s) 140.

It should be understood that, the range sensor 140 may be, for example, a millimeter-wave radar, a LiDAR, and the like.

Figure 3A:
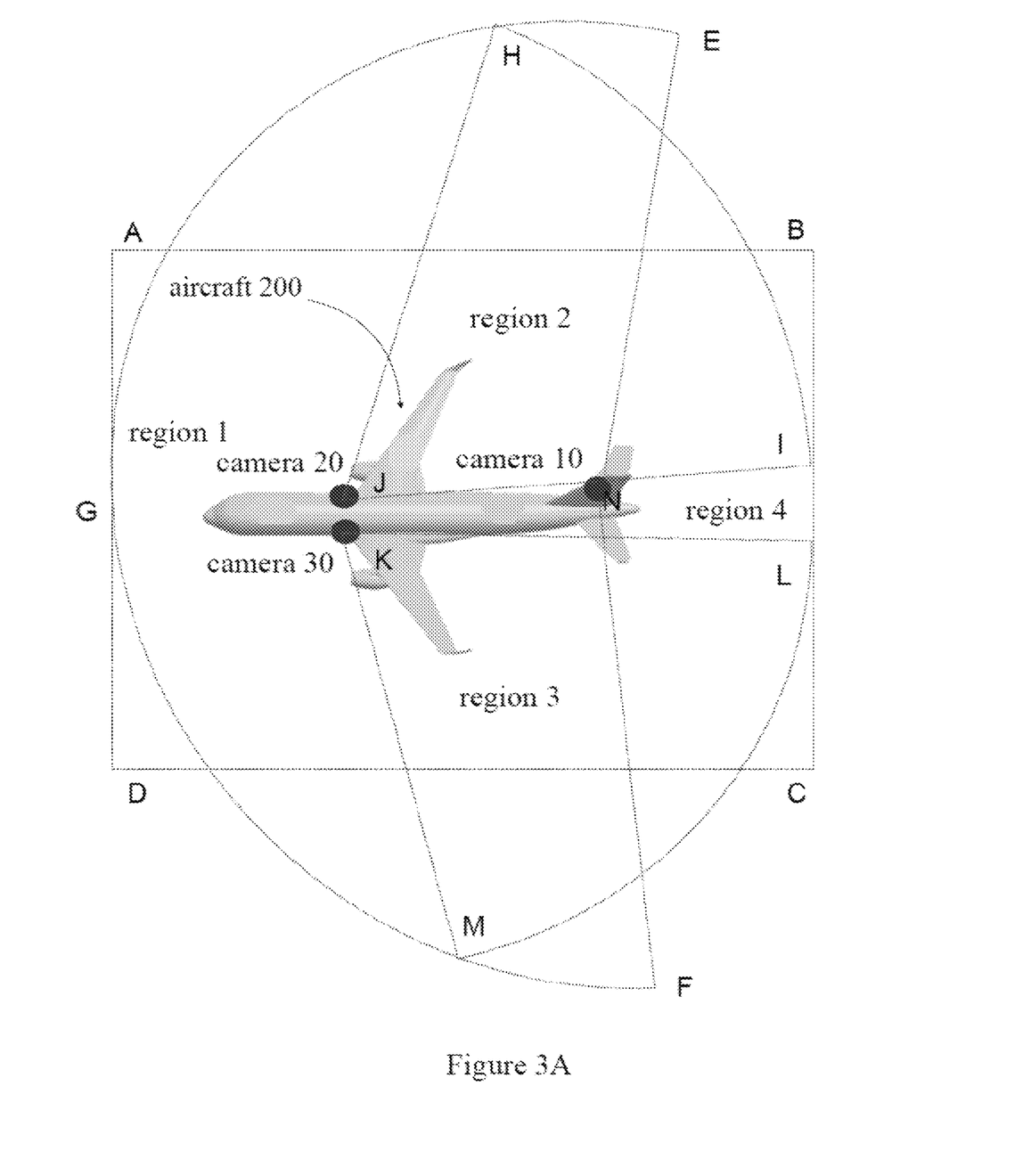
FIG. 3A schematically shows four safety protection regions divided based on FOVs of vision sensors installed on an aircraft according to an embodiment of the present disclosure.
Figure 3B:
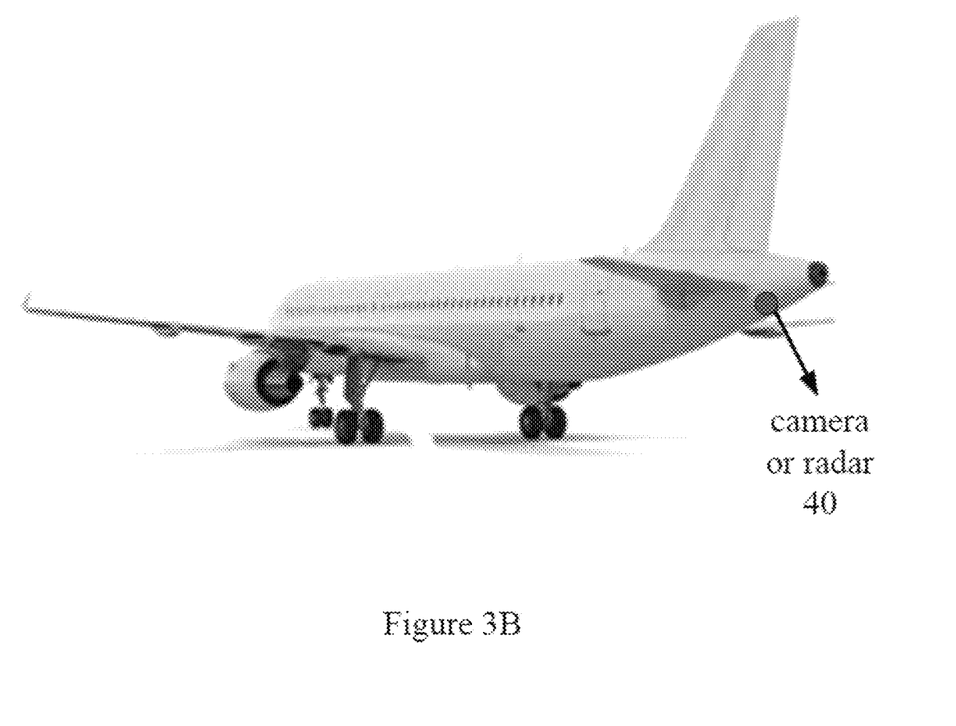
FIG. 3B schematically shows a camera or a radar installed below a tail portion of an aircraft.

Specifically, the vision sensor 108 may include cameras 10, 20 and 30 shown in FIG. 3A and a camera 40 shown in FIG. 3B. For example, as shown in FIG. 3A, the camera 10 may be installed above the tail fin of an aircraft 200, cameras 20 and 30 may be installed on two sides of the fuselage of the aircraft 200, and as shown in FIG. 3B, camera 40 may be installed below the tail fin of the aircraft 200.

It should be understood that, the vision sensors 108 is not limited to the four cameras and their respective installation positions as shown in FIGS. 3A and 3B. Instead, more or less cameras may be provided and installed at any appropriate positions according the shape of the aircraft as needed, as long as FOVs of these cameras cover the required surrounding environment of the aircraft.

Preferably, the cameras 10, 20, 30 and 40 may be installed in close proximity to lights on the aircraft, to ensure imaging quality.

It should be understood that, the wheel speed sensor 130 may be installed on a wheel of the aircraft. The range sensor(s) 140 may be installed adjacent to the cameras 10, 20, 30 and/or 40.

According to an embodiment, the sensor data processing unit 102 may detect potential collision objects around the aircraft 200 based on data received from the ADS-B In 109, the cameras 10, 20, 30 and 40, and/or the range sensor(s) 140, and provide, in a case that an objected is detected, data associated with the detected object to the risk assessment unit 104 for assessing whether there is a collision risk.

It is known that ADS-B is a terminology in the aeronautical field, and indicates automatically obtaining parameters from related airborne equipment and reporting information of a position, an altitude, a speed, heading, an identification number, and the like of an aircraft to other aircrafts or a ground station, without manual operation or inquiry, such that a controller monitors a state of the aircraft. According to a transmission direction of aircraft broadcast information, ADS-B may be classified into ADS-B Out and ADS-B In. ADS-B Out indicates that an airborne ADS-B transmitter periodically sends position information and other additional information of the aircraft to other aircrafts or an air traffic controller on the ground. ADS-B In indicates that an ADS-B receiver of the aircraft receives information sent by an ADS-B transmitter of another aircraft or information sent by ADS-B ground station equipment.

Therefore, based on the data sent by the ADS-B In 109, the sensor data processing unit 102 may determine if there are other aircrafts around the aircraft 200, and may be informed of information on the other aircrafts.

The sensor data processing unit 102 may further provide an image that includes a potential collision object among images captured by the cameras 10, 20, 30 and/or 40 to the risk assessment unit 104 for risk assessment.

The sensor data processing unit 102 may determine whether there is a potential collision object around the aircraft 200 based on data output from the range sensor(s) 140.

It is to be noted that, according to the present embodiment, the sensor data processing unit 102 determines whether there is a potential collision object around the aircraft 200 based on a combination of data from the ADS-B In 109, the cameras 10, 20, 30 and/or 40, and/or the range sensor(s) 140, collects potential collision objects detected by the various sensors and sends collected potential collision objects to the risk assessment unit 104 for collision risk assessment.

Figure 2:
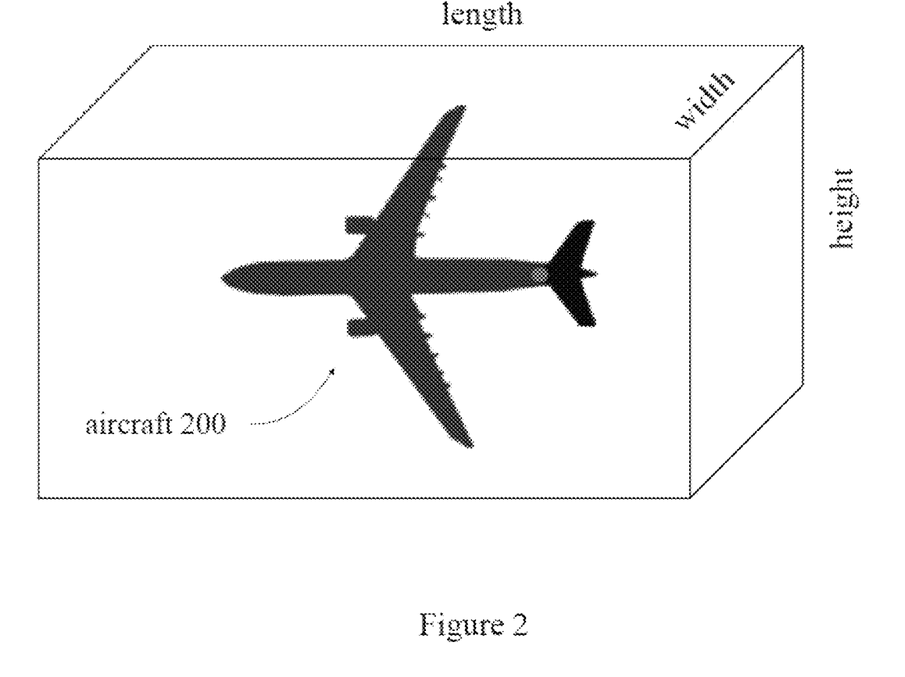
FIG. 2 schematically shows a 3D safeguarding box for an aircraft according to an embodiment of the present disclosure.

The safeguarding box building unit 103 is configured to generate, based on a geometry database 106 related to aircrafts, a 3D safeguarding box for the aircraft. The geometry database 106 includes geometric parameters, including lengths, heights and wingspan lengths, of various aircraft models. The 3D safeguarding box generated based on the geometric parameters of aircrafts is shown in FIG. 2. As an example, in case that an aircraft has a length of 34m, a wingspan length of 34m and a height of 12m, the length, wingspan length and height of the 3D safeguarding box for the this-aircraft model are the length, wingspan length and height of the aircraft model plus a safety threshold, such as 10m. That is, the 3D safeguarding box for such an aircraft model has a length of 44m, a width of 44m and a height of 22m.

It should be understood that, the safety threshold may be set to different values as needed.

The risk assessment unit 104 is configured to calculate relative distances between detected objects and the aircraft, and determine whether there is a collision risk between the aircraft and an object, among the detected objects, located within the safeguarding box or to be entering into the safeguarding box.

Specifically, the risk assessment unit 104 calculates the relative distances between the detected objects and the aircraft based on data related to ranges of the detected objects provided by the sensor data processing unit 102 and the position information of the aircraft 200.

Figure 4:
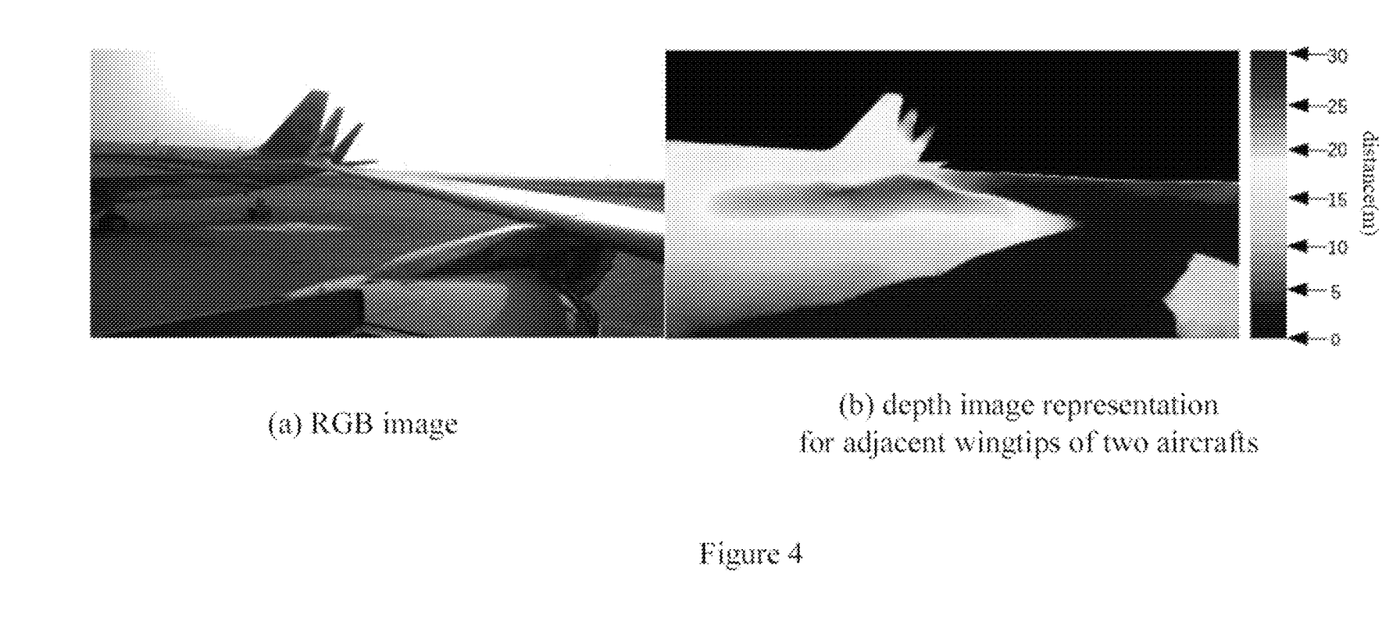
FIG. 4 shows an RGB image and a depth image representation of adjacent wingtips of two aircrafts.

For example, the risk assessment unit 104 may determine a relative distance between the aircraft and an object in images captured by the cameras 10, 20, 30 and/or 40 by using a known image processing technique. As shown in FIG. 4, a depth image may be generated based on RGB images captured by the cameras 10, 20, 30 and/or 40. It is known that, in 3D computer graphics, a depth image includes information on a distance to a surface of an object in a scene, and each pixel value of the depth image is an actual distance between the camera 10, 20, 30 and/or 40 and the object.

The risk assessment unit 104 may calibrate a depth error according to aircraft geometric parameters such as a wingspan length and a length of the aircraft, and adjust movement poses of the cameras 10, 20, 30 and/or 40 based on data output from the wheel speed sensor 130, thereby improving depth image generation.

It should be understood that although the image processing technique based on the depth image is used as an example for determining the relative distance between the aircraft and an object, the present disclosure is not limited thereto. Other suitable image processing techniques may also be applied to determine the relative distance.

The risk assessment unit 104 may alternatively calculate the relative distance between the object and the aircraft based on data of an object that is detected by the ADS-B In 109 or the range sensor(s) 140 and that is provided by the sensor data processing unit 102, and position information of the aircraft.

It should be understood that, the relative position information of the aircraft may be provided by the vision sensors 108, the range sensor(s) 140, and the like, and the absolute position information of the aircraft may be provided by the IMU 110 and the GPS 120. In addition, the relative position information of the aircraft may further be corrected by using data output from the wheel speed sensor 130.

As shown in FIG. 3A, the risk assessment unit 104 may further divide the safeguarding box into four safety protection regions based on FOVs of the cameras 10, 20, 30 and 40. As shown in FIG. 3A, the camera 10 may be, for example, a fisheye camera installed on a vertical stabilizer of the aircraft 200 and having a FOV of 192°. The FOV of the camera 10 corresponds to the arc NEGF in FIG. 3A. The camera 20 is installed in close proximity to a right wing scan light of the aircraft 200 and points to the right wing, where the FOV of the camera 20 corresponds to the arc JHI shown in FIG. 3A. The camera 30 is installed in close proximity to a left wing scan light of the aircraft 200 and points to the left wing, where the FOV of the camera 30 corresponds to the arc KLM shown in FIG. 3A. The safeguarding box of the aircraft 200 may be divided, for example, into a front region (region 1), a left region (region 2), a right region (region 3), and a rear region (region 4).

As shown in FIG. 3A, the cameras 10, 20 and 30 do not cover the region 4. In order to detect the potential collision object in the region 4, a camera or radar 40 may be installed below the tail of the fuselage, as shown in FIG. 3B.

It should be understood that, the safeguarding box shown in FIG. 3A is a projection of the safeguarding box shown in FIG. 2 along the height direction.

It should be further understood that, the present disclosure is not limited to the division of the safety protection regions shown in FIG. 3A, but any appropriate division may be adopted as needed.

The risk assessment unit 104 may determine, based on the calculated relative distance between the object and the aircraft, whether the object is located in any one of the safety protection regions 1 to 4 shown in FIG. 3A, and determine that there is the collision risk if the object is located in any one of the safety protection regions 1 to 4. In this case, the anti-collision system outputs an alarm.

It is to be noted that, the relative distance between the object and the aircraft may be corrected based on data output from the wheel speed sensor 130. For example, a relative displacement of the aircraft relative to the object may be obtained by integrating speed data output from the wheel speed sensor 130. In this case, the absolute position information of the aircraft may be obtained based on the relative displacement and initial position information of the aircraft. The initial position information may be obtained by using the IMU 110 and/or the GPS 120.

If the detected object is not located in any one of the safety protection regions 1 to 4, but is to be entering one of the safety protection regions 1 to 4, the risk assessment unit 104 calculates a proximity rate of the object based on the relative distance between the object and the aircraft:

Proximity rate=$\Delta D/\Delta T$, where $\Delta T$ represents a defined time period, and $\Delta D$ represents a change of the relative distance over the time period.

If the proximity rate exceeds a certain threshold (for example, 20 m/s) or a threshold range, the risk assessment unit 104 determines that there is the collision risk. In this case, the anti-collision system 100 outputs a warning. It should be understood that, the threshold or threshold range may be determined as needed.

For example, the risk assessment unit 104 may calculate a distance from the detected object to an edge of one of the safety protection regions based on the relative distance between the object and the aircraft. In a case that at least one of the aircraft and the detected object moves at a certain speed, and the distance from the object to the edge of one of the safety protection regions is less than a predetermined threshold, it is determined that the object is to be entering into the safety protection region. It should be understood that, the predetermined threshold may be set to an appropriate value as needed.

Preferably, the risk assessment unit 104 may be configured to, before calculating the relative distances between the detected objects provided by the sensor data processing unit 102 and the aircraft, classify the detected objects and filter out objects with which there is no collision risk. For example, the detected object may be classified into people, other aircraft, airport infrastructure, ground vehicle, and unknown.

In the scene of wingtip anti-collision, an object classified as people or ground vehicle having a height lower than the aircraft wing may be filtered out. As the object may not reach the height of the aircraft wing, wingtip collision will not occur.

It should be understood that, the detected object may be classified based on scene understanding. That is, objects in the images captured by the cameras 10, 20, 30 and/or 40 may be classified by using appropriate known image processing techniques. Details on how to classify the detected objects are not described herein in order not to obscure the present disclosure.

Optionally, the anti-collision system 100 may further include a user interface 105, and present the alarm or warning on the user interface 105.

According to another embodiment, an audio alarm or warning may be provided by using a user terminal device. For example, the alarm or warning may be output through a microphone or a mobile device.

Figure 5:
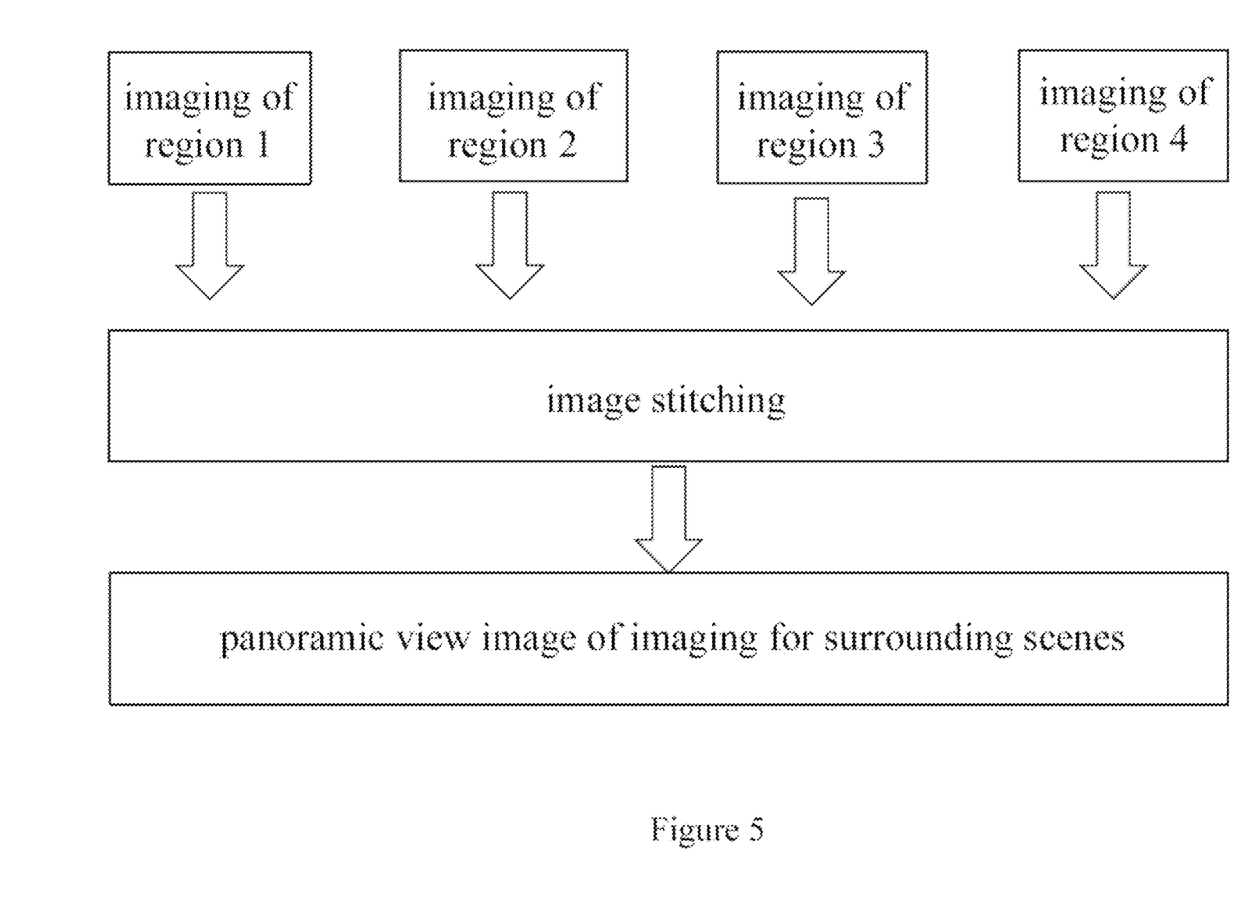
FIG. 5 schematically shows image stitching based on the divided safety protection regions.

Optionally, the anti-collision system 100 may further include an image stitching unit 101. In case of the camera 40 as shown in FIG. 3B, and as shown in FIG. 5, the image stitching unit 101 synchronizes video streams from the cameras 10, 20, 30 and 40, and stitches the video streams of the safety protection regions 1, 2, 3 and 4 shown in FIG. 3A, and displays a panoramic image of the surrounding environment of the aircraft on the user interface 105.

It should be understood that, in case of the radar 40 as shown in FIG. 3B, the image stitching unit 101 may also synchronizes video streams from the cameras 10, 20 and 30, and stitch the video streams of the safety protection regions 1, 2 and 3.

It should be also understood that, in the scene of wingtip anti-collision, and in case of the camera 40 as shown in FIG. 3B, the image stitching unit 101 may stitch only video streams related to the safety protection regions 2, 3 and 4.

Figure 6:
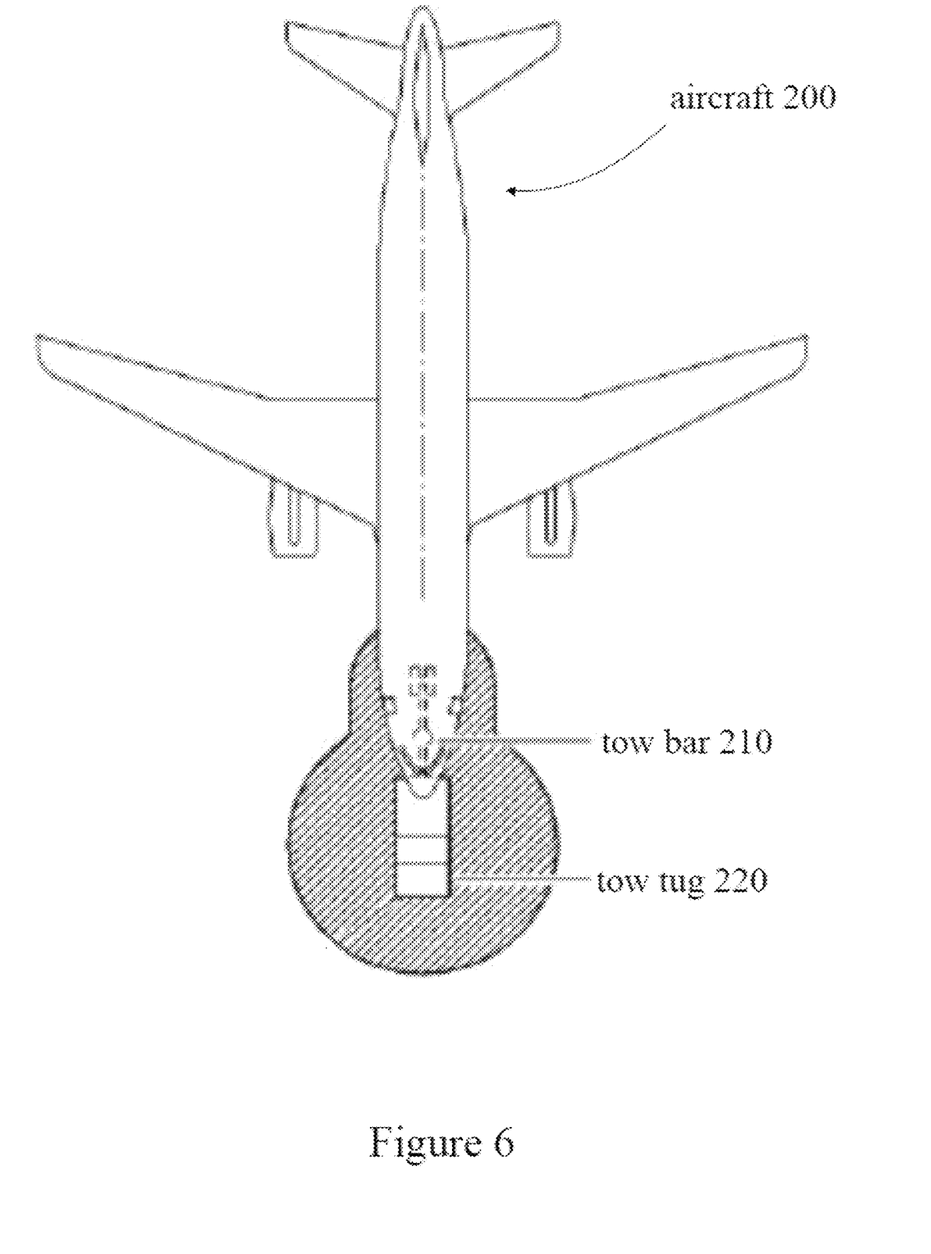
FIG. 6 schematically shows an aircraft under tow on the surface.

As shown in FIG. 6, when the aircraft 200 is towed by a tow bar 210 of a tow tug 220, a driver of the tow tug 220 or a pilot of the aircraft has poor visibility to the surrounding environment, in which case accidents are more likely to happen. By displaying the panoramic image on the user interface 105, perception of the surrounding situation by the driver of the tow tug or the pilot of the aircraft when the aircraft is under tow or during taxiing can be improved, thereby further avoiding the collision risk.

It is to be noted that, when the aircraft is under tow, the driver of the tow tug is responsible for safety. Therefore, the panoramic image displayed on the user interface 105 may be shared to the driver of the tow tug for example via a local network, thereby further improving safety.

It should be understood that, the image stitching unit 101 may perform image stitching by using known appropriate image stitching techniques. Details on image stitching are not described herein in order not to obscure the present disclosure.

Preferably, the anti-collision system may further adjust brightness of light(s) of a light system 107 when the surrounding environment of the cameras 10, 20, 30 and/or 40 is dark, so as to improve the quality of images captured by the cameras installed in close proximity to the lights.

In the above, the anti-collision system 100 according to the embodiments of the present disclosure is described in connection to FIGS. 1 to 6. As can be seen from the above, the anti-collision system according to the present disclosure achieves adaptive perception of the environment, enhanced safety and improved visibility.

Figure 7:
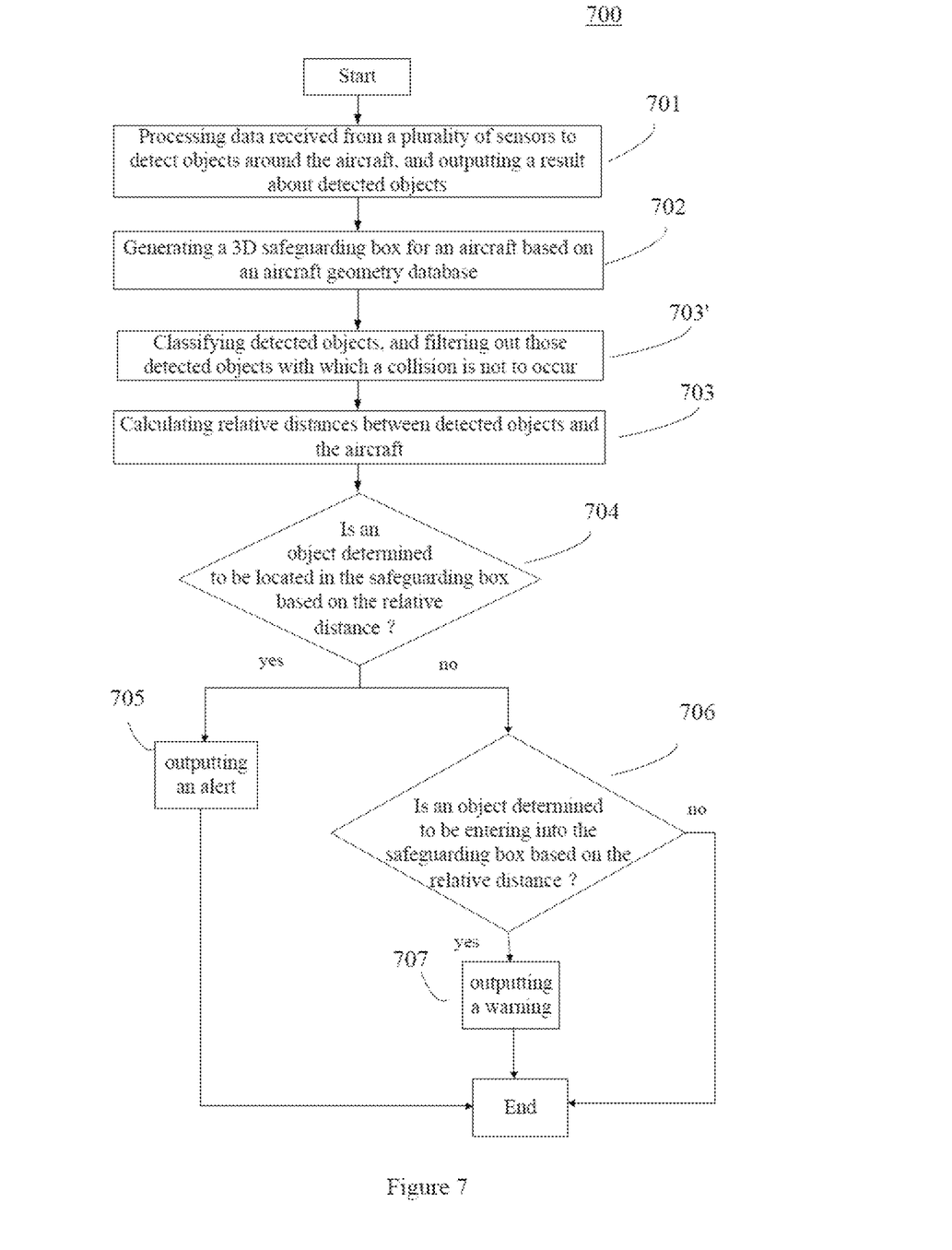
FIG. 7 is a flow chart of an anti-collision method for an aircraft according to an embodiment of the present disclosure.

FIG. 7 is a flow chart of an anti-collision method for an aircraft according to an embodiment of the present disclosure. In the following, the anti-collision method 700 according to the present disclosure is described in connection to FIG. 7.

First, in step 701, data from a plurality of sensors is received, and a result about detected objects is output. Specifically, the data from the sensors may be received and the result about detected objects may be output by using, for example, the sensor data processing unit 102 shown in FIG. 1.

Next, in step 702, a three-dimensional safeguarding box for the aircraft is generated based on an aircraft geometry database. Specifically, the three-dimensional safeguarding box for the aircraft may be generated by using, for example, the safeguarding box building unit 103 shown in FIG. 1.

Then, in step 703, relative distances between detected objects and the aircraft are calculated. Specifically, the relative distances between the detected objects and the aircraft may be calculated by using, for example, the risk assessment unit 104 shown in FIG. 1.

Preferably, the anti-collision method 700 may further include a step 703': classifying the detected objects, and filtering out those detected objects with which collision will not occur. Specifically, objects detected by the cameras 10, 20, 30 and/or 40 may be classified and the objects with which collision will not occur are filtered out by using, for example, the risk assessment unit 104 shown in FIG. 1 by utilizing an appropriate image processing technique.

Next, in step 704, it is determined, based on the relative distances, whether an object are located within the safeguarding box. Specifically, whether an object is located within the safeguarding box may be determined based on the relative distances by using, for example, the risk assessment unit 104 shown in FIG. 1. The risk assessment unit 104 determines that there is a collision risk if the object is located within the safeguarding box, and outputs an alarm in step 705, and then the method 700 ends.

If it is determined that the object is not located in the safeguarding box, it is determined in step 706 based on the relative distance whether an object is to be entering into the safeguarding box. Specifically, whether the object is to be entering into the safeguarding box may be determined based on the relative distances by using, for example, the risk assessment unit 104 shown in FIG. 1. If the object is to be entering into the safeguarding box, it is determined that there is the collision risk, and the risk assessment unit 104 outputs a warning in step 707, and then the method 700 ends.

If it is determined that the object is not to be entering into the safeguarding box, the method 700 ends.

It is to be noted that, the anti-collision method 700 shown in FIG. 7 corresponds to the anti-collision system 100 shown in FIG. 1. Therefore, relevant details of the steps of the anti-collision method 700 have been given in detail in the description of the anti-collision system 100 shown in FIG. 1, and will not be repeated here.

Based on the above description, the following examples are provided according to the embodiments of the present disclosure, however, the present disclosure is not limited thereto.

EXAMPLE 1

An anti-collision system for an aircraft, including
a sensor data processing unit configured to process data received from a plurality of sensors to detect objects around the aircraft, and output a result about detected objects;

a safeguarding box building unit configured to generate, based on an aircraft geometry database, a three-dimensional safeguarding box for the aircraft; and a risk assessment unit configured to calculate relative distances between detected objects and the aircraft, and determine whether there is a collision risk between the aircraft and an object, among the detected objects, located in the safeguarding box or to be entering into the safeguarding box, wherein the system is configured to output an alarm or a warning when there is the collision risk.

EXAMPLE 2

The system according to Example 1, where the multiple sensors include a first vision sensor and a second vision sensor that are installed at a front portion of a fuselage of the aircraft.

EXAMPLE 3

The system according to Example 1, where the multiple sensors further include a third vision sensor installed above a tail portion of the fuselage of the aircraft and/or a fourth vision sensor installed below the tail portion of the fuselage.

EXAMPLE 4

The system according to Example 3, where the vision sensors are installed in close proximity to lights on the aircraft, and the lights are configured to illuminating surrounding environments of the vision sensors in responsive to an instruction from the system.

EXAMPLE 5

The system according to any one of Examples 1 to 4, further comprising an image stitching unit configured to synchronize images output from the vision sensors, and stitch the images to obtain a panoramic view image.

EXAMPLE 6

The system according to any one of Examples 1 to 5, where the risk assessment unit is further configured to calculate the relative distance between the aircraft and one of the detected objects based on received automatic dependent surveillance-broadcast data and absolute position information of the aircraft, determine whether the relative distance is less than a range for the safeguarding box, and output the alarm if the relative distance is less than the range for the safeguarding box.

EXAMPLE 7

The system according to any one of Examples 1 to 6, where the plurality of sensors further comprise a range sensor configured to detect a potential collision object around the aircraft, and the risk assessment unit is further configured to calculate the relative distance between the aircraft and one of the detected objects based on absolute position information of the aircraft and data received from at least one of the vision sensors and the range sensor, determine whether the relative distance is less than a range for the safeguarding box, and output the alarm if the relative distance is less than the range for the safeguarding box.

EXAMPLE 8

The system according to any one of Examples 1 to 7, where the risk assessment unit is further configured to determine whether there is a collision risk with one of the detected objects by calculating a proximity rate of the object to be entering into the safeguarding box based on received automatic dependent surveillance-broadcast data and absolute position information of the aircraft, and output the warning if there is the collision risk.

EXAMPLE 9

The system according to any one of Examples 1 to 8, where the risk assessment unit is further configured to determine whether there is a collision risk with one of the detected objects by calculating a proximity rate of the object to be entering into the safeguarding box based on absolute position information of the aircraft and data received from at least one of the vision sensors and the range sensor, and output the warning if there is the collision risk.

EXAMPLE 10

The system according to any one of Examples 1 to 9, where the proximity rate is a rate of change of the relative distance between the aircraft and one of the detected object over time, and the warning is output if the rate of change is greater than a predetermined threshold.

EXAMPLE 11

The system according to any one of Examples 1 to 10, where the plurality of sensors further comprise a wheel speed sensor, and the risk assessment unit is further configured to calculate the proximity rate based on data output from the wheel speed sensor and used for correcting a relative displacement of the aircraft, wherein the absolute position information of the aircraft is obtained based on the relative displacement and initial position information of the aircraft.

EXAMPLE 12

The system according to Example 11, where the initial position information of the aircraft is provided by an inertial measurement unit and a global positioning system.

EXAMPLE 13

The system according to any one of Examples 1 to 12, where the risk assessment unit is further configured to classify the detected objects located within the safeguarding box or to be entering into the safeguarding box.

EXAMPLE 14

The system according to any one of Examples 1 to 13, where the object is classified into people, other aircraft, airport infrastructure, ground vehicle, and unknown.

EXAMPLE 15

The system according to any one of Examples 1 to 14, where the risk assessment unit is further configured to filter out those detected objects with which wingtip collision is not to occur based on a classification result.

EXAMPLE 16

The system according to any one of Examples 1 to 15, further including a user interface, configured to display the panoramic image, and present the warning or alarm provided by the risk assessment unit.

EXAMPLE 17

The system according to any one of Examples 1 to 16, when the aircraft is under tow, the alarm or the warning and the panoramic view image are shared among a driver of a tow tug, a pilot of the aircraft and maintenance engineering via a local network.

EXAMPLE 18

An aircraft, including the system according to any one of Examples 1 to 17.

EXAMPLE 19

An anti-collision method for an aircraft, including:
processing data received from a plurality of sensors to detect objects around the aircraft, and outputting a result about detected objects;
generating, based on an aircraft geometry database, a three-dimensional safeguarding box for the aircraft;
calculating relative distances between detected objects and the aircraft, and determining whether there is a collision risk between the aircraft and an object, among the detected objects, located in the safeguarding box or to be entering into the safeguarding box; and
outputting a warning or an alarm if there is the collision risk.

EXAMPLE 20

The method according to Example 19, further comprising classifying the detected objects, and filtering out those detected objects with which collision is not to occur.

EXAMPLE 21

The method according to Example 19 or 20, where the determining whether there is a collision risk further comprises calculating the relative distance between the aircraft and one of the detected objects based on received automatic dependent surveillance-broadcast data and absolute position information of the aircraft, determining whether the relative distance is less than a range for the safeguarding box, and outputting the alarm if the relative distance is less than the range for the safeguarding box.

EXAMPLE 22

The method according to any one of Example 19 to 21, where the determining whether there is a collision risk further comprises calculating the relative distance between the aircraft and one of the detected objects based on absolute position information of the aircraft and data received from at least one of the vision sensors and the range sensor, determining whether the relative distance is less than a range for the safeguarding box, and outputting the alarm if the relative distance is less than the range for the safeguarding box.

EXAMPLE 23

The method according to any one of Example 19 to 22, where the determining whether there is a collision risk further comprises calculating a proximity rate of the object to be entering into the safeguarding box based on received automatic dependent surveillance-broadcast data and absolute position information of the aircraft, to determine whether there is a collision risk with the object; and the method further includes outputting the alarm if it is determined that there is the collision risk.

EXAMPLE 24

The method according to any one of Example 19 to 23, where the determining whether there is a collision risk further comprises calculating a proximity rate of the object to be entering into the safeguarding box based on absolute position information of the aircraft and data received from at least one of the vision sensors and a range sensor, to determine whether there is a collision risk with the object; and the method further includes outputting the alarm if it is determined that there is the collision risk.

EXAMPLE 25

The method according to any one of Example 19 to 24, where the proximity rate is a rate of change of the relative distance between the aircraft and the object over time, and the method further comprises outputting the warning if the rate of change is greater than a predetermined threshold.

EXAMPLE 26

The method according to any one of Example 19 to 25, further comprising calculating the proximity rate based on data output from a wheel speed sensor and used for correcting a relative displacement of the aircraft, where the absolute position information of the aircraft is obtained based on the relative displacement and initial position information of the aircraft.

EXAMPLE 27

The method according to Example 26, where the initial position information of the aircraft is provided by an inertial measurement unit and a global positioning system.

Although the present disclosure is described above through the specific embodiments of the present disclosure, it should be understood that various modifications, improvements and equivalents may be made to the present disclosure by those skilled in the art within the scope and spirit of the attached claims. These modifications, improvements or equivalents should fall within the protection scope of the present disclosure.

The invention claimed is:
1. An anti-collision system for an aircraft, comprising:
a sensor data processing unit configured to process data received from a plurality of sensors to detect objects around the aircraft, and output a result about detected objects;
a safeguarding box building unit configured to generate, based on an aircraft geometry database, a three-dimensional safeguarding box for the aircraft; and a risk assessment unit configured to calculate relative distances between the detected objects and the aircraft, and determine whether there is a collision risk between the aircraft and an object, among the detected objects, located in the safeguarding box or to be entering into the safeguarding box,
wherein the anti-collision system is configured to output an alarm or a warning when there is the collision risk, and
wherein the risk assessment unit is further configured to:
calculate a proximity rate of an object to be entering into the safeguarding box among the detected objects, the proximity rate being a ratio of an amount of change of the relative distance between the aircraft and the detected objects during a determined period of time, to the period of time, and
determine that there is the collision risk if the ratio is greater than a predetermined threshold.

2. The anti-collision system according to claim 1, wherein the plurality of sensors comprise a first vision sensor and a second vision sensor installed at a front portion of a fuselage of the aircraft.

3. The anti-collision system according to claim 2, wherein the plurality of sensors further comprise a third vision sensor installed above a tail portion of the fuselage of the aircraft and/or a fourth vision sensor installed below the tail portion of the fuselage of the aircraft.

4. The anti-collision system according to claim 3, wherein the vision sensors are installed in close proximity to lights on the aircraft, and the lights are configured to illuminating surrounding environments of the vision sensors in response to an instruction from the anti-collision system.

5. The anti-collision system according to claim 4, further comprising an image stitching unit configured to synchronize images output from the vision sensors, and stitch the images to obtain a panoramic view image.

6. The anti-collision system according to claim 1, wherein the risk assessment unit is further configured to calculate the relative distance between the aircraft and one of the detected objects based on received automatic dependent surveillance-broadcast data and absolute position information of the aircraft, determine whether the relative distance is less than a range for the safeguarding box, and output the alarm if the relative distance is less than the range for the safeguarding box.

7. The anti-collision system according to claim 3, wherein the plurality of sensors further comprise a range sensor configured to detect a potential collision object around the aircraft, and the risk assessment unit is further configured to calculate the relative distance between the aircraft and one of the detected objects based on absolute position information of the aircraft and data received from at least one of the vision sensors and the range sensor, determine whether the relative distance is less than a range for the safeguarding box, and output the alarm if the relative distance is less than the range for the safeguarding box.

8. The anti-collision system according to claim 1, wherein the risk assessment unit is further configured to calculate the proximity rate based on received automatic dependent surveillance-broadcast data and absolute position information of the aircraft.

9. The anti-collision system according to claim 3, wherein the plurality of sensors further comprise a range sensor configured to detect a potential collision object around the aircraft, and
wherein the risk assessment unit is further configured to calculate the proximity rate based on absolute position information of the aircraft and data received from at least one of the vision sensors and the range sensor.

10. The anti-collision system according to claim 1, wherein the plurality of sensors further comprise a wheel speed sensor, and
wherein the risk assessment unit is further configured to calculate the proximity rate further based on data output from the wheel speed sensor and used for correcting a relative displacement of the aircraft, the absolute position information of the aircraft being obtained based on the relative displacement and initial position information of the aircraft.

11. The anti-collision system according to claim 10, wherein the initial position information of the aircraft is provided by an inertial measurement unit and a global positioning system.

12. The anti-collision system according to claim 1, wherein the risk assessment unit is further configured to classify the detected objects located in the safeguarding box or to be entering into the safeguarding box.

13. The anti-collision system according to claim 12, wherein the detected objects are classified into people, other aircraft, airport infrastructure, ground vehicle and unknown.

14. The anti-collision system according to claim 13, wherein the risk assessment unit is further configured to filter out those detected objects with which wingtip collision is not to occur based on a classification result.

15. The anti-collision system according to claim 5, further comprising a user interface configured to display the panoramic image, and present the warning or alarm provided by the risk assessment unit.

16. The anti-collision system according to claim 5, wherein, when the aircraft is under tow, the alarm or the warning and the panoramic view image are shared among a driver of a tow tug, a pilot of the aircraft and a maintenance engineer via a local network.

17. An aircraft comprising the anti-collision system according to claim 1.

18. An anti-collision method for an aircraft, including:
processing data received from a plurality of sensors to detect objects around the aircraft, and outputting a result about detected objects;
generating, based on an aircraft geometry database, a three-dimensional safeguarding box for the aircraft;
calculating relative distances between detected objects and the aircraft, and determining whether there is a collision risk between the aircraft and an object, among the detected objects, located in the safeguarding box or to be entering into the safeguarding box; and
outputting a warning or an alarm if there is the collision risk,
wherein the determining whether there is the collision risk further includes:
calculating a proximity rate of an object to be entering into the safeguarding box among the detected objects, the proximity rate being a ratio of an amount of change of the relative distance between the aircraft and the detected objects during a determined period of time, to the period of time, and
determining that there is the collision risk if the ratio is greater than a predetermined threshold.

19. The method according to claim 18, further comprising classifying the detected objects, and filtering out those detected objects with which collision is not to occur.

20. The method according to claim 18, wherein the determining whether there is the collision risk further comprises calculating the relative distance between the aircraft and one of the detected objects based on received automatic dependent surveillance-broadcast data and absolute position information of the aircraft, determining whether the relative distance is less than a range for the safeguarding box, and wherein the method further comprises outputting the alarm if the relative distance is less than the range for the safeguarding box.

21. The method according to claim 18, wherein the plurality of sensors include a vision sensor and a range sensor, wherein the determining whether there is the collision risk further comprises calculating the relative distance between the aircraft and one of the detected objects based on absolute position information of the aircraft and data received from at least one of the vision sensor and the range sensor, determining whether the relative distance is less than a range for the safeguarding box, and determining that there is the collision risk in case that the relative distance is less than the range for the safeguarding box, and wherein the method further comprises outputting the alarm in case of determining that there is the collision risk.

22. The method according to claim 18, wherein the proximity rate is calculated based on received automatic dependent surveillance-broadcast data and absolute position information of the aircraft.

23. The method according to claim 18, wherein the plurality of sensors include a vision sensor and a range sensor, and
wherein the proximity rate is calculated based on absolute position information of the aircraft and data received from at least one of the vision sensors and the range sensor.

24. The method according to claim 18, wherein the plurality of sensors include a wheel speed sensor, and
wherein the proximity rate is calculated further based on data received from the wheel speed sensor and used for correcting a relative displacement of the aircraft, the absolute position information of the aircraft being obtained based on the relative displacement and initial position information of the aircraft.

25. The method according to claim 24, wherein the initial position information of the aircraft is provided by an inertial measurement unit and a global positioning system.

* * * * *